US010442246B2

(12) United States Patent
Barker et al.

(10) Patent No.: US 10,442,246 B2
(45) Date of Patent: Oct. 15, 2019

(54) OBSTACLE MOVING DEVICE FOR WHEEL ASSEMBLY OF MOBILE DEVICE

(71) Applicant: General Electric Company, Schenectady, NY (US)

(72) Inventors: David Ellis Barker, Salt Lake City, UT (US); Brettany Rupert, Springville, UT (US); Melissa Elvia Barraza, Richland Hills, TX (US); Andrew A. May, Elk Ridge, UT (US); Cameron Barrett Pluim, Kentwood, MI (US); Cameron Michael Thevenin, Roswell, GA (US); Michael LeNeave, Columbus, IN (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/476,427

(22) Filed: Mar. 31, 2017

(65) Prior Publication Data
US 2018/0281718 A1 Oct. 4, 2018

(51) Int. Cl.
B60B 33/00 (2006.01)
B60R 19/54 (2006.01)

(52) U.S. Cl.
CPC ............ B60B 33/00 (2013.01); B60R 19/54 (2013.01); B60B 2900/551 (2013.01); Y10T 16/216 (2015.01)

(58) Field of Classification Search
CPC ... B60R 19/54; B60B 33/00; B60B 2900/551; Y10T 16/216
See application file for complete search history.

(56) References Cited

U.S. PATENT DOCUMENTS

| 971,970 | A | * | 10/1910 | Campbell | ............... | B60B 33/00 16/18 CG |
| 1,007,878 | A | * | 11/1911 | Krell | ...................... | B60R 19/54 280/160 |
| 1,089,322 | A | * | 3/1914 | Carreiro | .................. | B60R 19/54 15/79.1 |
| 1,398,925 | A | * | 11/1921 | Tyler | ...................... | B60B 33/00 248/345.1 |

(Continued)

FOREIGN PATENT DOCUMENTS

| DE | 102006049071 B3 | 11/2007 |
| EP | 1077169 A2 | 2/2001 |
| WO | 2011045278 A1 | 4/2011 |

OTHER PUBLICATIONS

Steinco, Paul vom Stein GmbH; Caster and Wheels, 2012, 96 pages http://www.magnusinc.com/docs/Brochure-Steinco.pdf.

(Continued)

Primary Examiner — Jeffrey O'Brien
(74) Attorney, Agent, or Firm — Fletcher Yoder, P.C.

(57) ABSTRACT

A device configured to couple to a wheel assembly of a mobile device is provided. The device includes a first side portion configured to couple to a first lateral side of the wheel assembly. The device also includes a second side portion configured to couple to a second lateral side of the wheel assembly opposite the first lateral side, wherein the first and second side portions are compliant mechanisms configured to both move a movable obstacle out of a path of the mobile device and to retract in response to a force exerted on the first and second side portions by a fixed obstacle disposed along the path.

5 Claims, 5 Drawing Sheets

(56) References Cited

U.S. PATENT DOCUMENTS

| | | | | |
|---|---|---|---|---|
| 1,595,582 | A * | 8/1926 | Stedman | B60B 33/00 16/18 CG |
| 1,888,726 | A * | 11/1932 | Jarvis | B60B 33/00 16/18 CG |
| 1,906,590 | A * | 5/1933 | Hewson | B60B 33/00 16/18 CG |
| 2,046,384 | A * | 7/1936 | Katcher | B60B 33/00 15/159.1 |
| 2,059,348 | A * | 11/1936 | Herold | B60B 33/00 16/18 CG |
| 2,426,664 | A * | 9/1947 | Blazey | B60B 33/00 16/31 R |
| 2,450,062 | A * | 9/1948 | Voss | A47L 9/009 16/18 CG |
| 2,471,958 | A * | 5/1949 | Humphreys | B60B 33/00 16/18 CG |
| 2,923,017 | A * | 2/1960 | Turbyfill | B60B 33/00 15/246 |
| 2,996,752 | A * | 8/1961 | Pope | B60B 33/0002 105/170 |
| 3,182,705 | A * | 5/1965 | Markow | B60B 5/02 152/12 |
| 3,486,185 | A * | 12/1969 | Gerhard | B60B 33/00 16/18 CG |
| 3,818,542 | A * | 6/1974 | Jones | B60B 33/0052 16/18 CG |
| 4,025,099 | A * | 5/1977 | Virden | B60B 33/00 16/18 CG |
| 5,170,528 | A * | 12/1992 | Navar | B60B 33/00 16/18 CG |
| 5,371,920 | A * | 12/1994 | Rainville | B60B 33/00 128/203.12 |
| 5,524,916 | A | 6/1996 | Redens | |
| 5,615,450 | A * | 4/1997 | Butler | B60B 33/00 16/18 CG |
| 5,702,117 | A * | 12/1997 | Geelhoed | A61B 6/4405 16/18 CG |
| 5,873,144 | A * | 2/1999 | Tupper | B60B 7/02 16/18 CG |
| 5,983,452 | A * | 11/1999 | McGovern | B60B 33/00 16/18 B |
| 6,678,917 | B1 * | 1/2004 | Winters | B60B 7/00 16/18 CG |
| 7,770,853 | B2 | 8/2010 | Shiftier et al. | |
| 8,191,289 | B2 * | 6/2012 | Raftery | E01H 5/045 16/18 B |
| 8,869,733 | B2 | 10/2014 | Parnell | |
| 8,910,344 | B2 * | 12/2014 | Nguyen | B60B 7/00 16/18 B |
| 9,108,462 | B1 * | 8/2015 | Stone | B60B 33/0023 |
| 9,290,143 | B2 * | 3/2016 | Arjona | B60R 19/54 |
| 9,566,926 | B1 * | 2/2017 | Dubas | B60R 19/54 |
| 9,669,655 | B1 * | 6/2017 | Soliman | B60B 7/10 |
| 9,701,269 | B1 * | 7/2017 | Dubas | B60T 1/14 |
| 9,757,978 | B1 * | 9/2017 | Emigh | B60B 19/04 |
| 9,937,750 | B1 * | 4/2018 | Nelson | B60B 33/00 |
| 2006/0010642 | A1 * | 1/2006 | Nickson | B60B 7/00 16/18 CG |
| 2006/0113733 | A1 * | 6/2006 | Kazaoka | A61G 5/06 280/5.24 |
| 2010/0186192 | A1 * | 7/2010 | Trivini | B60B 7/04 16/25 |
| 2011/0247173 | A1 * | 10/2011 | Nguyen | B60B 7/00 16/45 |
| 2013/0127233 | A1 * | 5/2013 | Wollborg | B60B 19/00 301/5.23 |

OTHER PUBLICATIONS

Caster Guard, Armstrong Medical Industries, Inc., copyright 1999-2011 https://www.armstrongmedical.com/index.cfm/go/product.detail/sec/1/ssec/8/cat/6/scat/21/fam/2151.

Caster Concepts, Inc.; copyright 2016 http://www.casterconcepts.com/all-casters/caster-options/more-caster-options/.

* cited by examiner

OBSTACLE MOVING DEVICE FOR WHEEL ASSEMBLY OF MOBILE DEVICE

BACKGROUND

The subject matter disclosed herein relates to casters or wheel assemblies of a mobile device and, in particular, to devices coupled to the casters or wheel assemblies to move obstacles from the path of the mobile medical device.

Typically, mobile devices (e.g., mobile medical imaging systems) include wheel assemblies or casters that enable the mobile device to be moved to different locations. Sometimes the wheel assemblies or casters include devices that move obstacles (e.g., cables) out of the path of the mobile device. However, the design of these devices may not effectively move the obstacles out of the path or the devices may get entangled with certain obstacles. In addition, these devices may be subject to damage from these obstacles. Further, these devices may not enable the wheel assemblies or casters (and the mobile device) to move over certain obstacles (e.g., fixed obstacle such as step). Even further, the design of these devices may be complicated and costly.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a device configured to couple to a wheel assembly of a mobile device is provided. The device includes a first side portion configured to couple to a first lateral side of the wheel assembly. The device also includes a second side portion configured to couple to a second lateral side of the wheel assembly opposite the first lateral side, wherein the first and second side portions are compliant mechanisms configured to both move a movable obstacle out of a path of the mobile device and to retract in response to a force exerted on the first and second side portions by a fixed obstacle disposed along the path.

In accordance with a second embodiment, a device configured to couple to a wheel assembly of a mobile device is provided. The device includes a first side portion configured to couple to a first lateral side of the wheel assembly. The device also includes a second side portion configured to couple to a second lateral side of the wheel assembly opposite the first lateral side. The first and second side portions each include a first rigid portion and a second rigid portion extending in an axial direction relative to a path of the mobile device, the first rigid portion and a second rigid portion being vertically aligned with respect to each other, and multiple flexible members spaced apart from each other and extending between the first and second rigid portions in a radial direction relative to the path of the mobile device, wherein the first rigid portion is configured to move in both the axial and radial directions relative to the second rigid portion in response to a force exerted on the first rigid portion by a fixed obstacle disposed along the path.

In accordance with a third embodiment, a device configured to couple to a wheel assembly of a mobile device is provided. The device includes a first side portion configured to couple to a first lateral side of the wheel assembly. The device also includes a second side portion configured to couple to a second lateral side of the wheel assembly opposite the first lateral side, wherein the first and second side portions each include a respective collar portion, each respective collar portion is configured to partially extend in a circumferential direction about a stem of the wheel assembly, and the respective collar portions of the first and second side portions are configured to couple to each other to form a collar about the stem. The first and second side portions are each formed of a single piece. The first and second side portions are compliant mechanisms configured to both move a movable obstacle out of a path of the mobile device and to retract in response to a force exerted on the first and second side portions by a fixed obstacle disposed along the path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The following embodiments describe a device (e.g., shroud or cover) configured to couple to a wheel assembly or caster of a mobile device. The device both moves moveable obstacles (e.g., cables) out of a path of the mobile device and retracts out of way of a fixed obstacle (e.g., step) disposed along the path in response to a force exerted on a portion of the device by the fixed obstacle. In particular, the device serves as a compliant mechanism that acts like a live spring to move or push the cables out of the way while keeping the wheel assembly from getting entangled in the cables and/or rolling over smaller sensitive cables. The compliant mechanism's ability to retract enables the wheel assembly to roll to a next floor height. The device is simple, while improving workflow and avoiding damage to small cables. The device is also configured to withstand changes in floor height.

Figure 1:
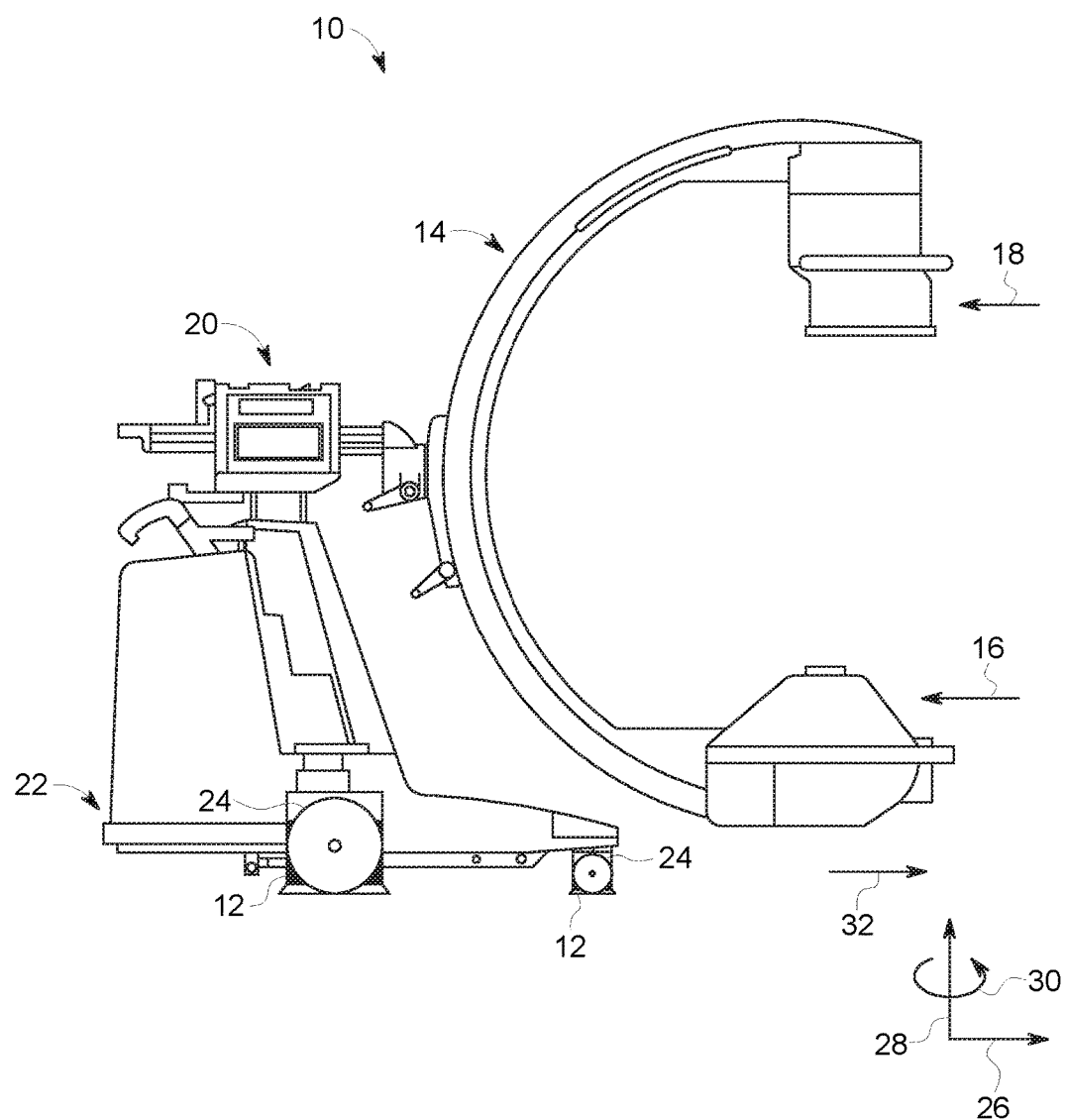
FIG. 1 is a side view of an embodiment of a mobile device (e.g., mobile X-ray imaging system) having devices (e.g., shrouds or covers) on wheel assemblies or casters to move obstacles from a path of the mobile device.

FIG. 1 is a side view of an embodiment of a mobile device 10 (e.g., mobile X-ray imaging system) having devices 12 on wheel assemblies or casters to move obstacles from a path of the mobile device 10. Although the device 12 is described with reference to a mobile X-ray imaging system, it can be utilized on any mobile device (e.g., medical or non-medical mobile device) having casters or wheel assemblies (e.g., cart). The system 10 includes a C-arm 14, an image receptor 16 (e.g., X-ray detector), an X-ray source 18, a support structure 20, and a wheeled base 22. The image receptor 16 and the X-ray source 18 are mounted at opposing locations on the C-arm 14. The support structure 20 provides support for the C-arm 14 and holds the C-arm 14 in a suspended position. The image receptor 16 may be an image intensifier or other energy receptor for using in diagnostic imaging, for example. The image receptor 18 and the X-ray source 20 are used to generate a diagnostic image representative of the object being imaged. The support structure 20 is mounted on the wheeled base 22 that enables the system 10 to be moved. The wheeled base 22 includes wheel assemblies or casters 24 having the devices 12 coupled to them. The devices 12 both move moveable obstacles (e.g., cables) out of a path of the mobile device 10 and retract out of way of a fixed obstacle (e.g., step) disposed along the path in response to a force exerted on a portion of the device 12 by the fixed obstacle.

Throughout the discussion, a coordinate system will be referenced. The coordinate system includes an axial direction 26, a radial direction 28, and a circumferential direction 30 (e.g., defined relative to a path 32 of the mobile device 10).

Figure 2:
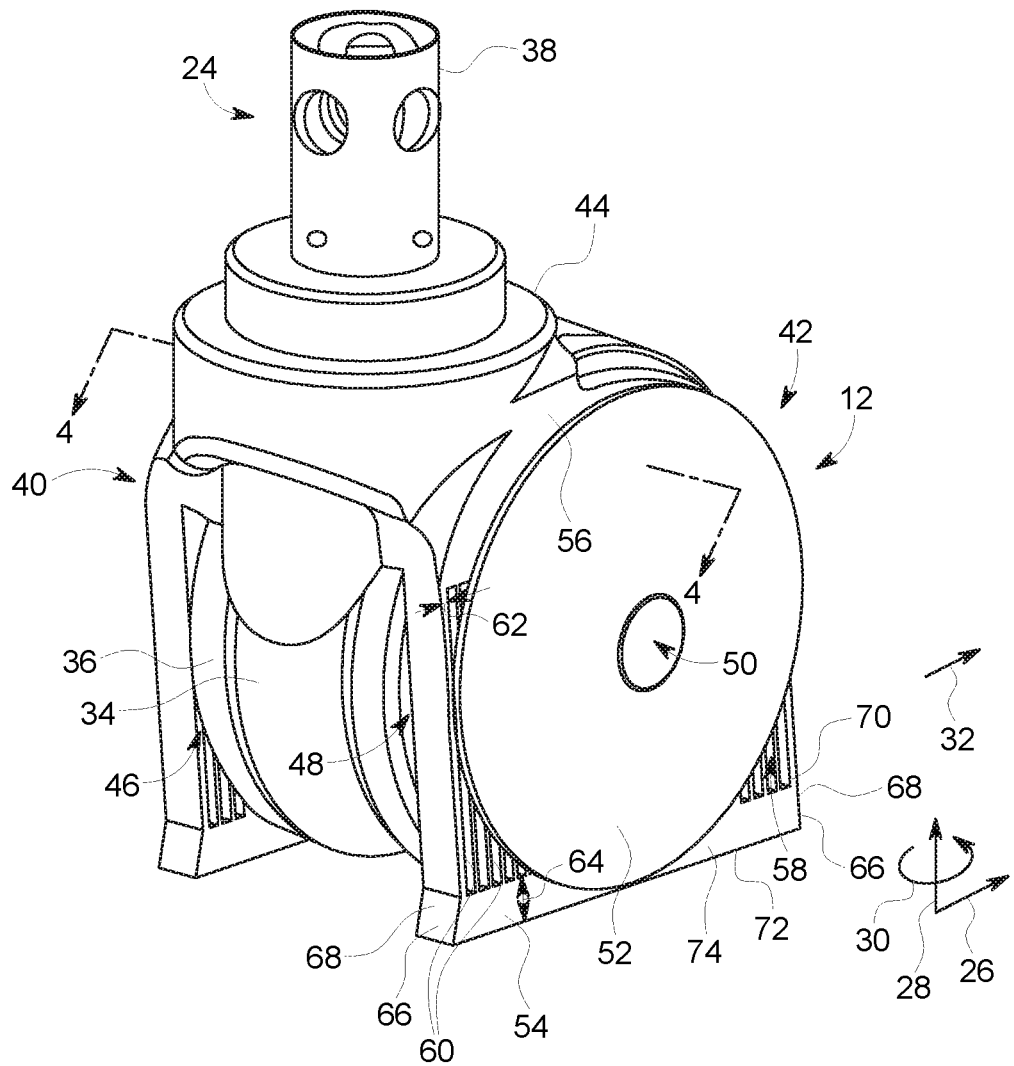
FIG. 2 is a perspective view of an embodiment of a device (e.g., shroud or cover) coupled to a wheel assembly or caster.

FIG. 2 is a perspective view of the device 12 (e.g., shroud or cover) coupled to the wheel assembly or caster 24. The type of caster 24 that the device 12 can be used with may vary. For example, the caster 24 may be a swivel or rigid caster. The caster 24 could include a plate, stem, or other component to mount it to the mobile device 10. The caster 24 may include a single wheel or multiple wheels. The caster 24 may include different shaped rig, yokes, or housings to couple to the wheel or wheels. As depicted, the caster 24 includes a housing 34 (e.g., yoke or rig) coupled to (e.g., between) a couple of wheels 36. The housing 34 is coupled to a stem 38 that couples the caster 24 to the mobile device 10. In addition, the device 12 can be utilized with other types of wheel assemblies besides casters.

The device 12 includes a first side portion 40, a second side portion 42, and a collar portion 44. The side portions 40, 42 act as compliant mechanisms. Compliant mechanisms are flexible mechanisms that transfer an input force (e.g., from encountering a fixed obstacle) or displacement to another point through elastic body deformation. Compliant mechanisms, such as the side portions 40, 42, may be monolithic (i.e., single-piece) and/or jointless. The first and second side portions 40, 42 are coupled to a first lateral side 46 and a second lateral side 48 of the caster 24 (e.g., outer surfaces of the wheels 36), respectively. The first and second side portions 40, 42 are coupled to the caster 24 via a fastener assembly 50 (e.g., nut and bolt assembly extending through the device 12 and the caster 24). The fastener assembly 50 provides rigidity to the first and second portions 40, 42 to enable them to both move movable objects (e.g., cables) and retract in response to a force exerted on the side portions 40, 42 by a fixed obstacle (e.g., step). The side portions 40, 42 are also coupled together via the collar portion 44. The collar portion 44 extends circumferentially 30 about the stem 38 and/or housing 34 of the caster 24. In certain embodiments, the collar portion 44 includes a first collar portion (e.g., coupled to the first side portion 40) and a second collar portion (e.g., coupled to the second side portion 42) separate from the first collar portion that couple together about the stem 38 and/or housing 34 to form the collar portion 44. In certain embodiments, the collar portion 44 may be a single piece configured to snap or fit onto the stem 38 and/or housing 34. As depicted, a cover 52 is coupled to each side portion 40, 42 via the fastener assembly 50.

Each side portion 40, 42 includes a first rigid portion 54 and a second rigid portion 56 coupled together via a flexible portion 58. The second rigid portion 56 is disposed above and vertically aligned in the radial direction 28 with the first rigid portion 58. The first rigid portion 54 is configured to be disposed closer to a floor or surface than the second rigid portion 56. The rigid portions 54, 56 extend in the axial direction 26. The rigid portions 54, 56 are more rigid than the flexible portion 58.

The flexible portion 58 extends in the radial direction 28 from the first rigid portion 54 to the second rigid portion 56. The flexible portion 58 includes a plurality of flexible members 60 extending radially 28 between the rigid portion 54, 56. As depicted, the flexible members 60 are straight. In certain embodiments, the flexible members 60 may not be straight. For example, the flexible members 60 may have a non-linear shape (e.g., curve shape, serpentine shape, etc.). The number of flexible members 60 may vary from 2 to 20 or another number. The flexible members 60 are spaced apart from each other in the axial direction 26. In certain embodiments, the axial spacing between a portion (e.g., within a set) of the flexible members 60 may be the same. In other embodiments, the axial spacing between the flexible members may vary. Each flexible member 60 includes a width or thickness 62 (e.g., in the axial direction 26) that is less than a width or thickness 64 of each rigid portion 54, 56 (e.g., in the radial direction 28).

In certain embodiments, the side portions 40, 42 (including their respective collar portions) may each be formed as a single piece. In other embodiments, the side portions 40, 42 along with the collar portion 44 may form a single piece. In certain embodiments, the side portions 40, 42 and/or the collar portion 44 may be formed of the same material. The side portions 40, 42 and/or the collar portion may be formed of nylon, polypropylene, polyurethane, polyoxymethylene, or a combination thereof.

The side portions 40, 42 are configured to move a moveable obstacle (e.g., cable) out of the path 32 (e.g., to the side) of the mobile device 10. The first rigid portion 54 includes angled portions 66 on longitudinal ends 68 of the rigid portion 54. The angled portions 66 taper radially 28 from a top surface 70 to a bottom surface 72 of the rigid portion 54 in the axial direction 26 away from a main body 74 of the rigid portion 54. The angled portions 66 enable the rigid portion 54 to engage underneath the moveable obstacle. The angled portions 66 may also engage the fixed obstacle.

The side portions 40, 42 are configured to also retract in response to a force (e.g., axial force) exerted on the side portions 40, 42 by a fixed obstacle (e.g., step or threshold) in the path 32 of the mobile device 10. In particular, a force (e.g., axial force) exerted on the first rigid portion 54 and/or the flexible portion 58 causes the side portions 40, 42 (e.g., the first rigid portion 54 and a portion of the flexible portion 58) to move or retract in both the axial direction 26 (e.g., in the same direction as the force applied) and the radial direction 28. Specifically, the first rigid portion 54 and a portion of the flexible portion 58 move both in the axial direction 26 away from the second rigid portion 56 and the radial direction 28 toward the second rigid portion 56. Thus, the device 12 is rigid enough to move moveable obstacles out of the path 32 but flexible enough to enable retraction of the device 12 to enable the caster 24 to move over the fixed obstacle. As noted above, the fastener assembly 50 provides rigidity to the first and second portions 40, 42 to enable them to both move movable objects (e.g., cables) and retract in response to a force exerted on the side portions 40, 42 by a fixed obstacle (e.g., step).

Figure 3:
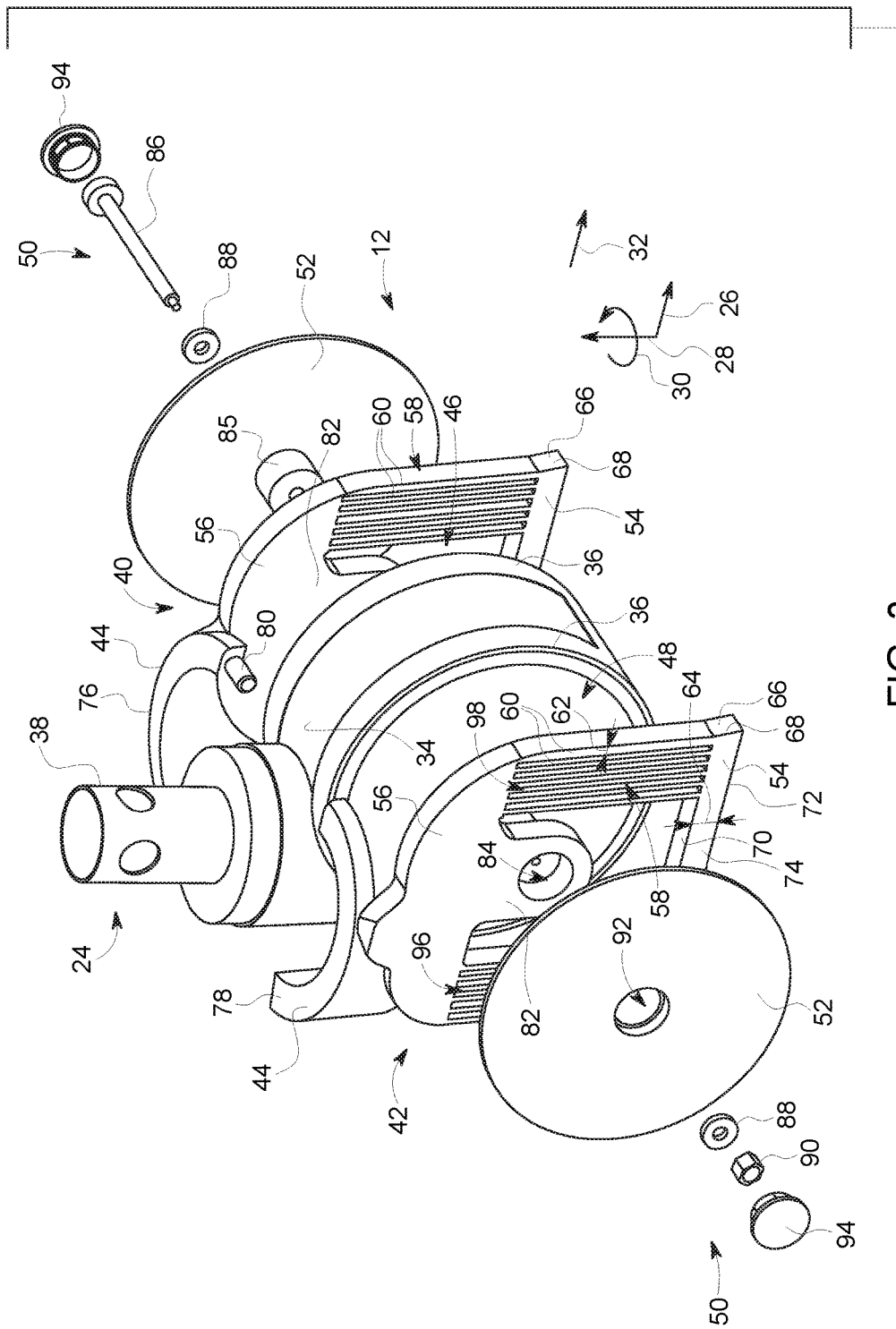
FIG. 3 is a perspective exploded view of the device (e.g., shroud or cover) of FIG. 2 about the wheel assembly or caster.

FIG. 3 is a perspective exploded view of the device 12 (e.g., shroud or cover) of FIG. 2 about the wheel assembly or caster 24. In general, the device 12 is as described in FIG. 2. As depicted in FIG. 3, the side portions 40, 42 include collar portions 76, 78, respectively. The collar portions 76, 78 each partially extend circumferentially 30 about the stem 38 and/or housing 34 of the caster 24. The collar portions 76, 78 couple together about the stem 38 and/or housing 34 of the caster 24 to couple the side portions 40, 42. In certain embodiments, the collar portion 76 includes a pin 80 that fits into an opening or recess within the collar portion 78.

Figure 4:
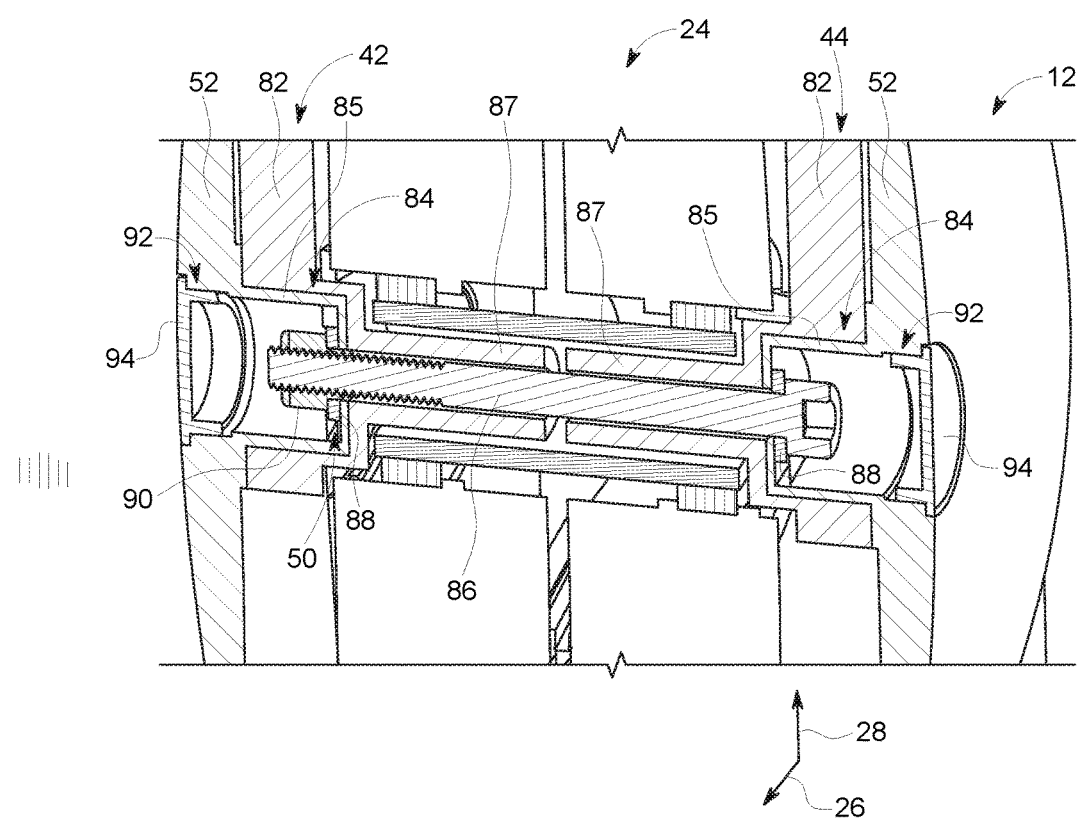
FIG. 4 is a cross-sectional view of the device (e.g., shroud or cover) of FIG. 2 coupled to the wheel assembly or caster, taken along line 4-4 of FIG. 2.

Also, as depicted in FIG. 3, each side portion 40, 42 includes an extension 82 that partially extends (e.g., radially 28) from the second rigid portion 56 toward the first rigid portion 58. The extension 82 includes an opening 84 configured to receive components of the fastener assembly 50. In certain embodiments, the opening 84 is also configured to receive a protrusion 85 of the cover 52 to couple the cover 52 to the respective side portion 40, 42. The side portions 40, 42 also each include an annular portion 87 that extends (e.g., horizontally) from the extension 82 in a direction between the side portions 40, 42 (see FIG. 4).

As depicted, the fastener assembly 50 includes a bolt 86, washers 88, and a nut 90. The bolt 86 extends through portions of the caster 24 and the openings 84 of the extensions 82 (including the annular portions 87) to couple (along with the other components of the fastener assembly 50) the side portions 40, 42 of the device 12 together (see FIG. 4). The fastener assembly 50 provides rigidity to the first and second portions 40, 42 to enable them to both move movable objects (e.g., cables) and retract in response to a force exerted on the side portions 40, 42 by a fixed obstacle (e.g., step). In certain embodiments, the covers 52 each include an opening 92 to receive a cap 94 (see FIG. 4).

As depicted in FIG. 3, the flexible portion 58 of each side portion 40, 42 includes a first set 96 and a second set 98 of flexible members 60. The first and second sets 96, 98 of flexible members 60 flank (e.g., axially 26) the extension 82. As depicted, each set 96, 98 of flexible members 60 includes the same number of flexible members 60 (e.g., 6). In certain embodiments, the number of flexible members 60 in each set 96, 98 may differ from each other. The number of flexible members 60 in each set 96, 98 may vary (e.g., from 2 to 12 or another number).

Figure 5:
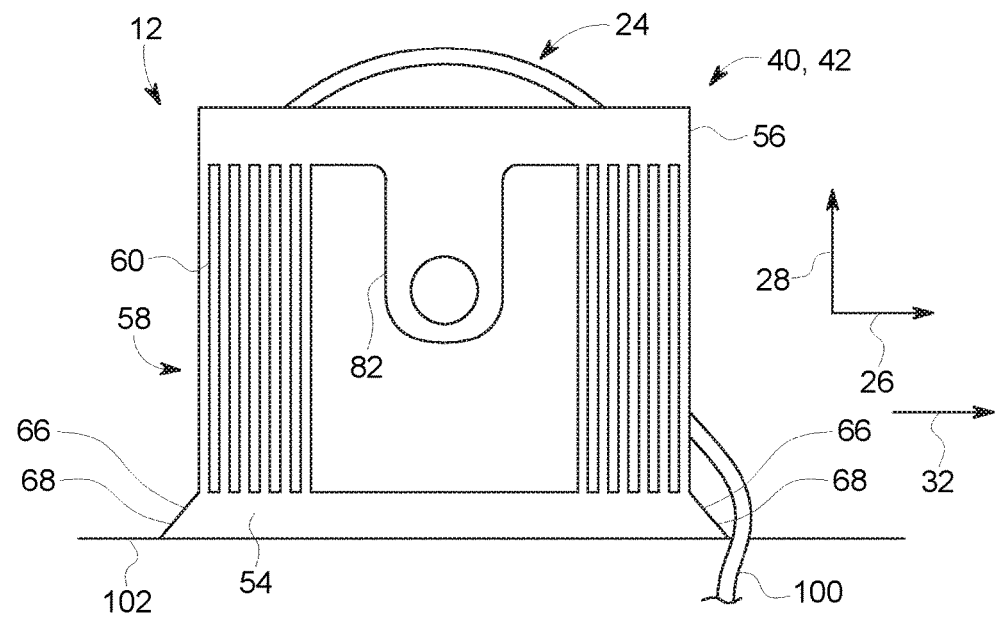
FIG. 5 is a side view of a side portion of the device of FIG. 2 interfacing with a movable obstacle.

FIG. 5 is a side view of the side portion 40, 42 of the device 12 of FIG. 2 interfacing with a movable obstacle 100 (e.g., cable). In particular, as the mobile device 10 moves along a surface or floor 102, the angled portion 66 enables the rigid portion 54 to engage underneath the moveable obstacle 110 to move the obstacle 110 of the path 32 (e.g., to the side) of the mobile device 10.

Figure 6:
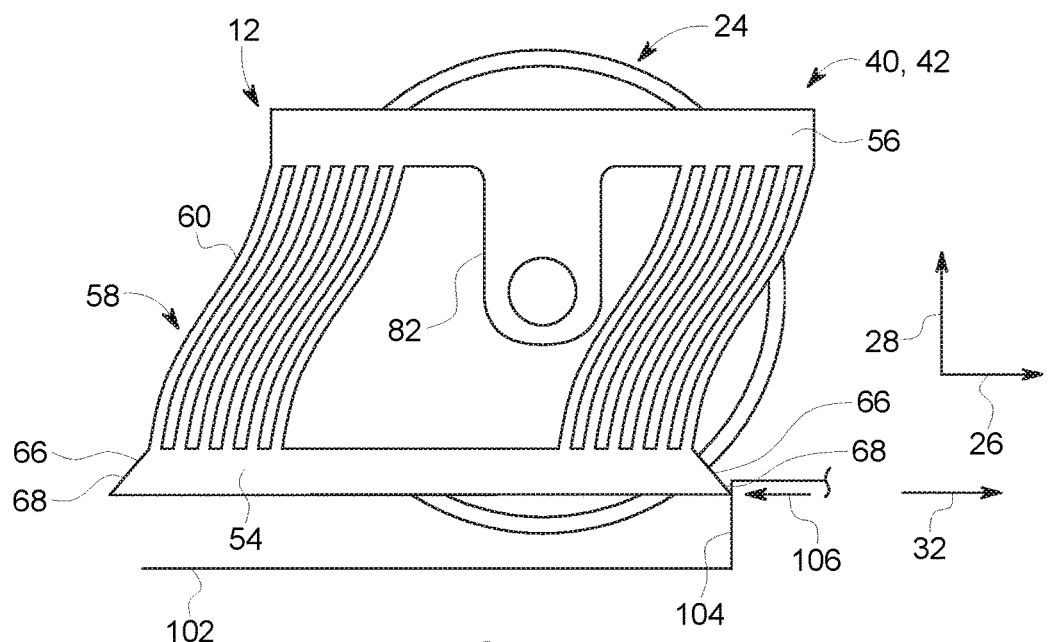
FIG. 6 is a side view of a side portion of the device of FIG. 2 interfacing with a fixed obstacle.

FIG. 6 is a side view of the side portion 40, 42 of the device 12 of FIG. 2 interfacing with a fixed obstacle 104 (e.g., step or threshold). As depicted, the side portions 40, 42 retract in response to a force 106 (e.g., axial force) exerted on the side portions 40, 42 by the fixed obstacle 104 in the path 32 of the mobile device 10. In particular, the force 106 (e.g., axial force) exerted on the first rigid portion 54 and/or the flexible portion 58 causes the causes the side portions 40, 42 (e.g., the first rigid portion 54 and a portion of the flexible portion 58) to move or retract in both the axial direction 26 (e.g., in the same direction as the force applied) and the radial direction 28. Specifically, the first rigid portion 54 and a portion of the flexible portion 58 move both in the axial direction 26 away from the second rigid portion 56 and the radial direction 28 toward the second rigid portion 56.

Technical effects of the disclosed embodiments include providing a device (e.g., shroud or cover) for a caster or wheel assembly. In particular, the device serves as a compliant mechanism that acts like a live spring to move or push the cables out of the way while keeping the wheel assembly from getting entangled in the cables and/or rolling over smaller sensitive cables. The compliant mechanism's ability to retract enables the wheel assembly to roll to a next floor height. The device is simple, while improving workflow and avoiding damage to small cables. The device is also configured to withstand changes in floor height.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A device configured to couple to a wheel assembly of a mobile device, comprising:
a first side portion configured to couple to a first lateral side of the wheel assembly; and
a second side portion configured to couple to a second lateral side of the wheel assembly opposite the first lateral side;
wherein the first and second side portions each comprise a first rigid portion and a second rigid portion extending in an axial direction relative to a path of the mobile device, the first rigid portion and the second rigid portion being vertically aligned with respect to each other, and a plurality of flexible members spaced apart from each other and extending between the first and second rigid portions in a radial direction relative to the path of the mobile device, wherein each flexible member of the plurality of flexible members comprises a first end integrally coupled to the first rigid portion and a second end integrally coupled to the second rigid portion, wherein the first rigid portion is configured to move in both the axial and radial directions relative to the second rigid portion due to elastic deformation in response to a force exerted on the first rigid portion by a fixed obstacle disposed along the path, and wherein an entirety of each flexible member of the plurality of flexible members is straight in the radial direction prior to elastic deformation.

2. The device of claim 1, wherein the first rigid portion being configured to move in response to the force on the first rigid portion by the fixed obstacle enables the wheel assembly to move over the fixed obstacle.

3. The device of claim 1, wherein the first and second side portions are configured to move a movable obstacle out of the path of the mobile device.

4. The device of claim 3, wherein longitudinal ends of the first rigid portion form angled portions that taper in the axial direction, and wherein the angled portions are configured to engage the movable obstacle or the fixed obstacle.

5. A device configured to couple to a wheel assembly of a mobile device, comprising:
   a first side portion configured to couple to a first lateral side of the wheel assembly; and
   a second side portion configured to couple to a second lateral side of the wheel assembly opposite the first lateral side, wherein the first and second side portions each comprise a respective collar portion, each respective collar portion is configured to partially extend in a circumferential direction about a stem of the wheel assembly, and the respective collar portions of the first and second side portions are configured to couple to each other to form a collar about the stem, wherein the first and second side portions are each formed of a single piece, wherein the first and second side portions are compliant mechanisms configured to both move a movable obstacle out of a path of the mobile device and to undergo elastic deformation to retract in response to a force exerted on the first and second side portions by a fixed obstacle disposed along the path, and wherein the first and second side portions each comprise a first rigid portion and a second rigid portion extending in an axial direction relative to the path of the mobile device, the first rigid portion and the second rigid portion being vertically aligned with respect to each other, a flexible portion extending between the first and second rigid portions solely in a radial direction relative to the path of the mobile device prior to elastic deformation.

* * * * *